United States Patent
Hirata

(10) Patent No.: US 8,489,932 B2
(45) Date of Patent: Jul. 16, 2013

(54) SERVER SYSTEM AND CRASH DUMP COLLECTION METHOD

(75) Inventor: Yutaka Hirata, Tokyo (JP)

(73) Assignee: NEC Corporation, Tokyo (JP)

(*) Notice: Subject to any disclaimer, the term of this patent is extended or adjusted under 35 U.S.C. 154(b) by 204 days.

(21) Appl. No.: 12/829,150

(22) Filed: Jul. 1, 2010

(65) Prior Publication Data

US 2011/0004780 A1  Jan. 6, 2011

(30) Foreign Application Priority Data

Jul. 6, 2009 (JP) ................................. 2009-159717

(51) Int. Cl.
*G06F 11/00* (2006.01)

(52) U.S. Cl.
USPC .......... 714/38.11; 714/38.1; 714/6.1; 714/6.2

(58) Field of Classification Search
USPC .............................................. 714/38.1, 38.11
See application file for complete search history.

(56) References Cited

U.S. PATENT DOCUMENTS

| 2006/0168439 | A1* | 7/2006 | Oguma | ............................. 713/2 |
| 2007/0050675 | A1* | 3/2007 | Yu | ................................. 714/36 |

FOREIGN PATENT DOCUMENTS

| JP | 62-52647 A | 3/1987 |
| JP | 5-6295 A | 1/1993 |
| JP | 9-223046 A | 8/1997 |
| JP | 2004280538 A | 10/2004 |
| JP | 2007122552 A | 5/2007 |
| JP | 2007334587 A | 12/2007 |
| JP | 2008176682 A | 7/2008 |
| JP | 2008546077 A | 12/2008 |
| JP | 2009075992 A | 4/2009 |

OTHER PUBLICATIONS

Japanese Office Action for JP2009-159717 issued May 16, 2011.
Japanese Office Action for JP2009-159717 issued Dec. 16, 2011.

* cited by examiner

*Primary Examiner* — Sarai Butler

(57) ABSTRACT

There is provided a server system that collects memory information at the time of occurrence of a failure if a failure occurs in the operating system so as to enable failure analysis. Stall monitoring of a firmware is performed by hardware and, if a stall is detected, a reset is performed. A memory has a memory area used by a boot loader of the firmware and a memory area used by another part of the firmware. It is determined based on a reset factor retained in a device whether the reset is a normal reset or a reset associated with the stall detection. In the case where the reset is a reset associated with the stall detection, information of the memory area of the memory used by the another part of the firmware at the time of occurrence of the stall is collected.

8 Claims, 6 Drawing Sheets

SERVER SYSTEM AND CRASH DUMP COLLECTION METHOD

The present application is based upon and claims the benefit of priority from Japanese Patent Application No. 2009-159717 filed on Jul. 6, 2009, the entire contents of which being incorporated herein in its entirely by reference.

TECHNICAL FIELD

The present invention relates to a server system and a crash dump collection method and, more particularly, to a crash dump collection method for collecting crash dump of firmware installed in a server system and a server system.

BACKGROUND ART

A server system is a computer system used in a mission-critical system, in which firmware, which is software directly controlling hardware in the server system, is installed.

A plurality of CELLs can be mounted in an enterprise server system, and a host operating system (OS) can be made to run in a state where one or more CELLs are bundled together. The CELL means a baseboard corresponding to a motherboard of a personal computer. In order to control the CELL itself, each CELL has a management board (MGMT) thereon, and the firmware (hereinafter referred to as "BMCFW") operates on the MGMT. The MGMT may be duplicated for continuous system operation against failure occurrence in the MGMT.

FIG. 1 is a block diagram illustrating an example of the CELL mounted in a server system of a background art. FIG. 1 illustrates one CELL 100, and the CELL 100 has one MGMT 101. The MGMT 101 is a management board composed of various hardware components, and some hardware components required for a BMCFW 102 to operate are illustrated in FIG. 1.

In the example of FIG. 1, the BMCFW 102 stored in a FLASHROM (non-volatile flash memory) is activated by a service processor (SP) 103 upon power-on of the MGMT 101 and then starts its software operation. The SP 103, which is referred to as "baseboard management controller (BMC)", is a microcontroller serving as a control center for the MGMT. The SP 103 includes a Central Processing Unit (CPU) and various connector interfaces such as a serial port, a LAN port, and USB port.

The operating system of the BMCFW 102 is loaded on a memory 104 and starts program operation on the memory 104. The operating system is, for example, Embedded Linux. The memory 104 is referred to as "synchronous dynamic random access memory (SDRAM)". The data content of the memory 104 is erased by a reset of the SP 103 or power disconnection of the MGMT 101 and may not be guaranteed.

Stall monitoring of the BMCFW 102 is performed by hardware using a Programmable Logic Device (PLD) 105. If a stall is detected, the PLD 105 resets the MGMT 101 and restarts the BMCFW 102. The stall means a halt state (stopped state) of the BMCFW 102.

FIG. 2 is a flowchart illustrating the flow of processing performed in the system of FIG. 1. The BMCFW 102 of FIG. 1 is an embedded Linux, in which application programs operate on an operating system called kernel. If a failure occurs inside the kernel (step S100 in FIG. 2), the kernel halts (step S101 in FIG. 2).

The PLD 105 constantly monitors the BMCFW 102. If there is no reply for a certain period of time from the BMCFW 102, the PLD 105 determines that the BMCFW 102 has halted (step S102 in FIG. 2). This function of the PLD 105 is referred to as "Watchdog Timer (WDT)".

Upon activation of the WDT, the PLD 105 issues a reset to the SP 103 (step S103 in FIG. 2). Then; the BMCFW 102 is released from the halt state and restarted (S104 of FIG. 2). Upon activation of the BMCFW 102, the system operation is restarted (step S105 in FIG. 2). In the method, the use of the WDT allows the BMCFW 102 to be released from its halt state.

The following Patent Documents 1 to 4 disclose techniques relating to the above-described server system.

CITATION LIST

Patent Literature

{PTL 1} JP-A-2004-280538
{PTL 2} JP-A-2009-075992
{PTL 3} JP-A-62-052647
{PTL 4} Jpn. PCT National Publication No. 2008-546077

SUMMARY OF INVENTION

Technical Problem

As described above, in the server system wherein the MGMT is mounted inside the CELL, firmware is used to control the MGMT, and embedded Linux is adopted as the operating system for the firmware, the stall monitoring of the firmware is performed by hardware and, if the stall is detected, the firmware is reset.

However, the firmware cannot discriminate between a reset by the hardware and a rest associated with a normal power-on operation. Further, a memory image at the stall time of the firmware cannot be collected. Thus, with the reset performed by hardware at the time of occurrence of the BMCFW stall, information during the BMCFW stall cannot be left, preventing investigation of causes of the BMCFW stall.

An object of the present invention is to restore a firmware, if a failure occurs in the operating system, while collecting memory information at the failure occurrence so as to enable failure analysis.

Solution to Problem

A server system according to a first exemplary aspect of the present invention includes a device for monitoring a stall of firmware and performing a reset at the time of detection of the stall, a memory having an area used by a boot loader of the firmware and an area used by another part of the firmware, and a controller for operating the boot loader to determine a reset factor that indicates whether the reset is a reset associated with the stall detection or a normal reset and to collect information in the area of the memory used by the another part of the firmware if the reset factor is the stall detection.

A crash dump collection method according to a second exemplary aspect of the present invention is applied to a server system including a device for monitoring a stall of firmware and performing a reset at the time of detection of the stall, and a first memory having an area used by a boot loader of the firmware and an area used by another part of the firmware, wherein the firmware is operated by a controller. The crash dump collection method includes determining, by the controller, a reset factor that indicates whether the reset is a reset associated with the stall detection or a normal reset, and collecting, by the controller, information in the area of the first memory used by the another part of the firmware if the reset factor is the stall detection.

Advantageous Effects of Invention

According to the present invention, collection of crash dump (memory image at the occurrence of failure) of firmware can be achieved, thereby realizing analysis of a software failure in the firmware or a hardware failure. This minimizes system down time to allow system operation to continue.

DESCRIPTION OF EMBODIMENTS

Figure 1:
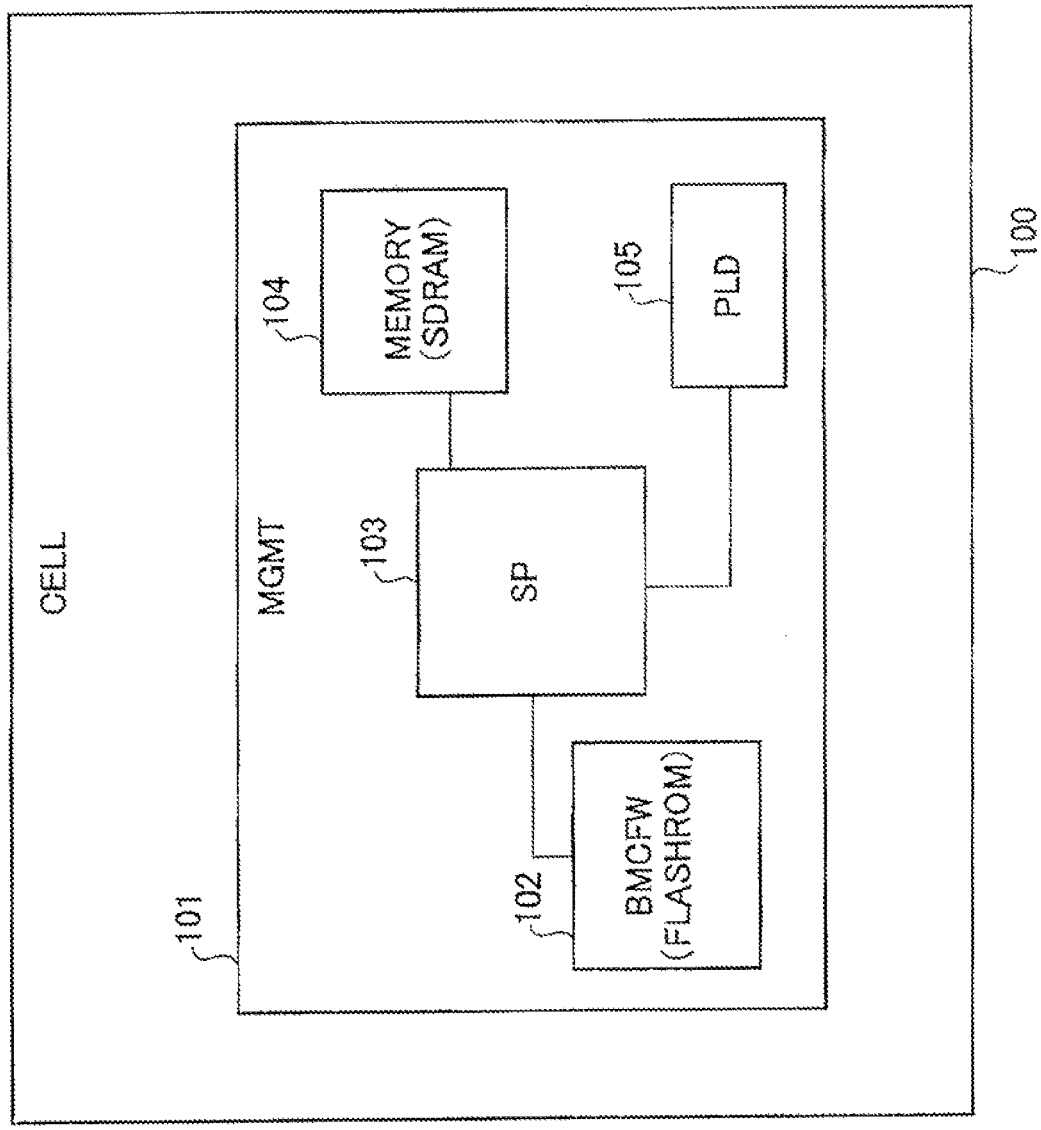
FIG. 1 A block diagram illustrating a server system of a background art.
Figure 2:
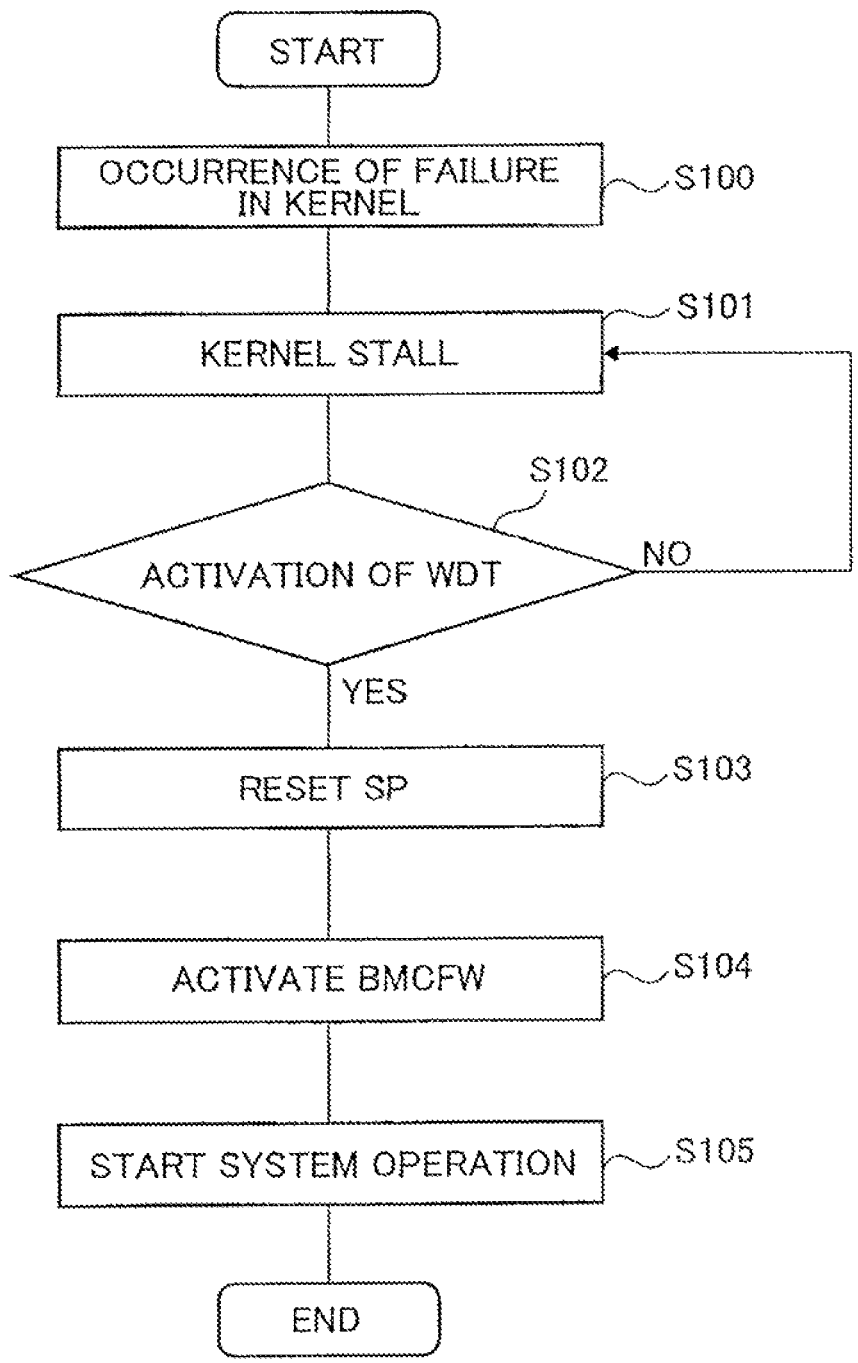
FIG. 2 A flowchart illustrating operation performed in the system of FIG. 1.
Figure 3:
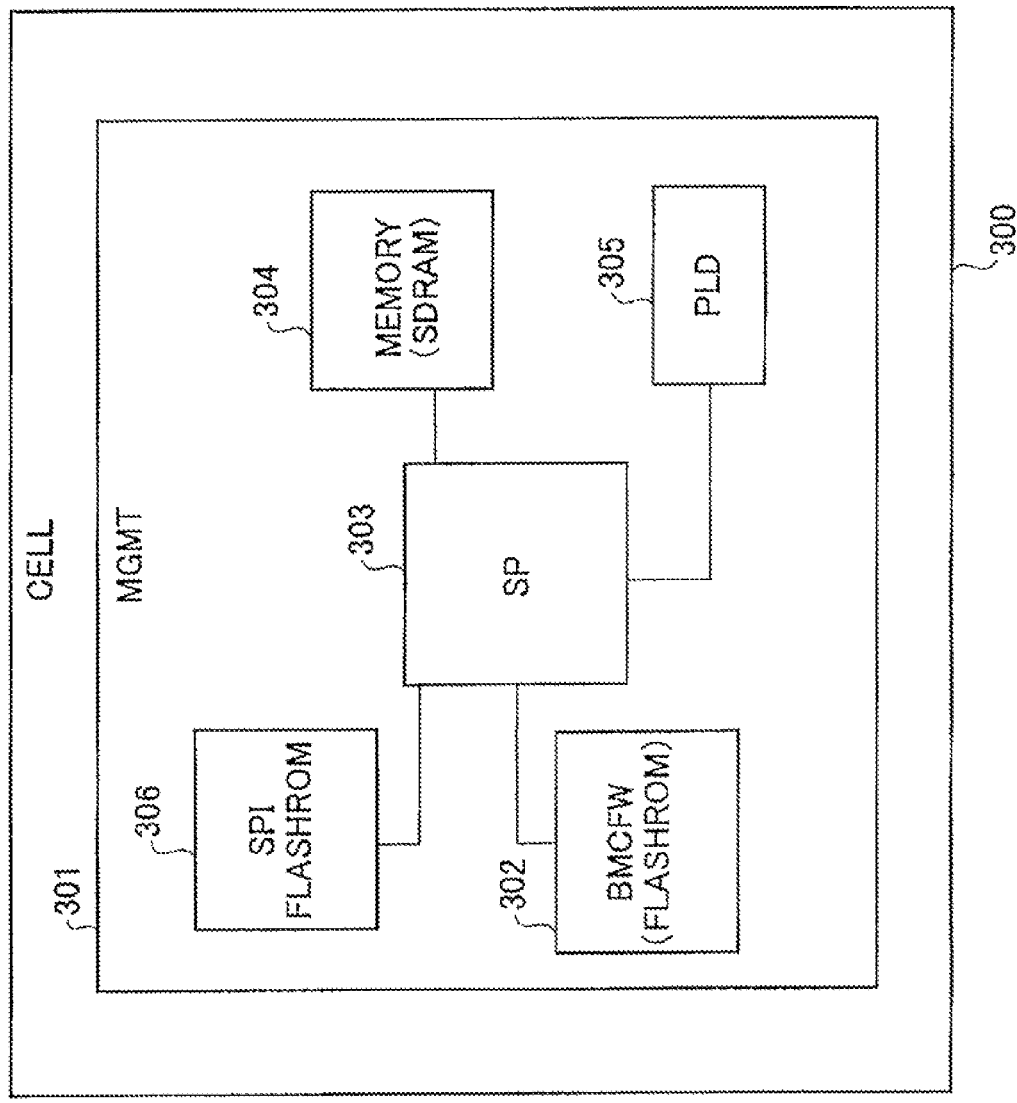
FIG. 3 A block diagram illustrating an exemplary embodiment of a server system according to the present invention.

An exemplary embodiment for practicing the present invention will be described in detail with reference to the accompanying drawings. FIG. 3 is a block diagram illustrating an exemplary embodiment of a server system according to the present invention. The server system of the exemplary embodiment illustrated in FIG. 3 differs from the system of FIG. 1 in that an SPI FLASHROM 306 is added. FIG. 3 illustrates one CELL 300, and the CELL 300 has one MGMT 301. The MGMT 301 is a management board composed of various hardware components, and some hardware components required for a BMCFW 302 to operate are illustrated in FIG. 3. The CELL means a baseboard corresponding to a motherboard of a personal computer. The BMCFW means a management firmware for controlling the MGMT.

In the exemplary embodiment of FIG. 3, the BMCFW 302 stored in a FLASHROM as a non-volatile flash memory is activated by a service processor (SP) 303 upon power-on of the MGMT 301 and then starts its operation. The operating system of the BMCFW 302 is loaded on a memory 304 and starts operation on the memory 304. The operating system is, for example, Embedded Linux.

The memory 304 is referred to as "synchronous dynamic random access memory (SDRAM)". The data content of the memory 304 is erased by a reset of the SP 303 or power disconnection of the MGMT 301 and may not be guaranteed. A Programmable Logic Device (PLD) 305 performs stall monitoring of the BMCFW 302 by hardware. If a stall is detected, the PLD 305 resets the MGMT 301 and restarts the BMCFW 302. The stall means an unexpected halt state of the BMCFW 302.

The SPI FLASHROM 306 is a FLASHROM connected to the SP 303 by a serial peripheral interface (SPI) and stores crash dump (memory image) of the BMCFW 302.

Figure 4:
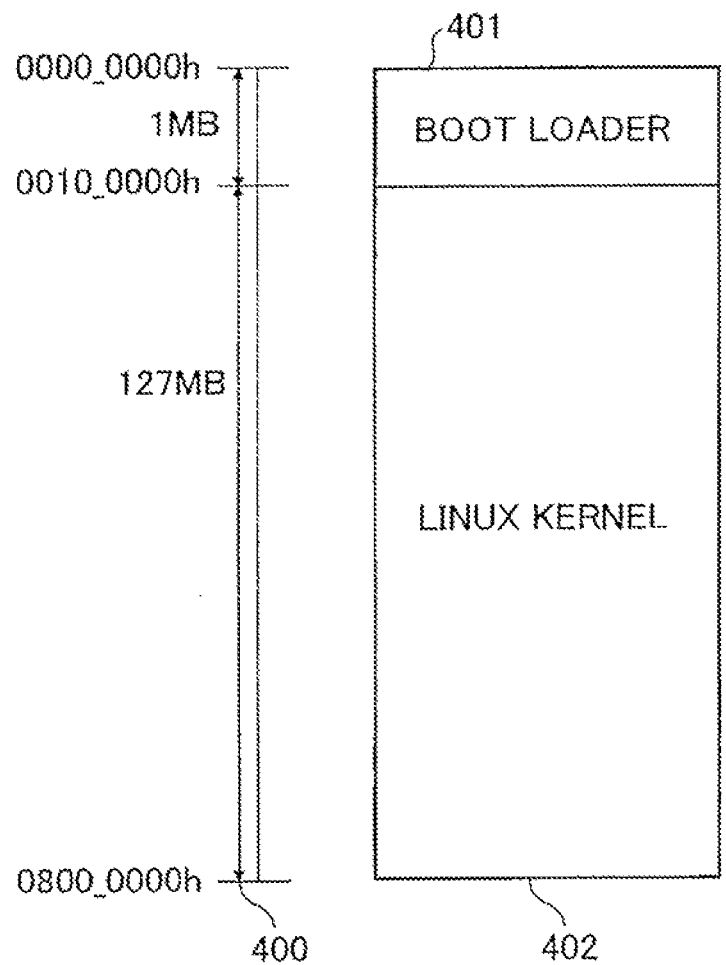
FIG. 4 A view illustrating a memory map of a BMCFW of FIG. 3.

FIG. 4 illustrates an example of a memory map of the BMCFW 302 of FIG. 3.

The BMCFW 302 is read out from the ROM area of the FLASHROM 302, loaded into the RAM area of the memory 304, and operates on the memory 304. Because of its characteristics as Embedded Linux, the software structure of the BMCFW 302 is divided into a boot loader 401 and a Linux kernel (another part of firmware) 402.

Upon activation of the BMCFW 302, the boot loader 401 is executed first, and then the Linux kernel 402 is executed. The memory 304 is allocated at address "0" as viewed from the BMCFW 302, and boot loader 401 and Linux kernel 402 use the memory 304 for their operation.

In a memory map 400 of FIG. 4, the memory area (memory map) is divided into two, one for the boot loader 401 and one for the Linux kernel 402 for allowing crash dump collection. It is assumed in the memory map 400 that the memory 304 has a storage capacity of 128 MB and that address space ranges from starting address (0000_0000h) to end address (0800_0000h).

For example, in FIG. 4, the boot loader 401 uses 1 MB from memory addresses (0000_0000h) to (000F_FFFFh), and Linux kernel 402 uses 127 MB from memory addresses (0010_0000h) to (07xFF_FFFFh). Dividing the memory map as illustrated in FIG. 4 prevents the memory areas used by the boot loader 401 and Linux kernel 402 from interfering each other.

Figure 5:
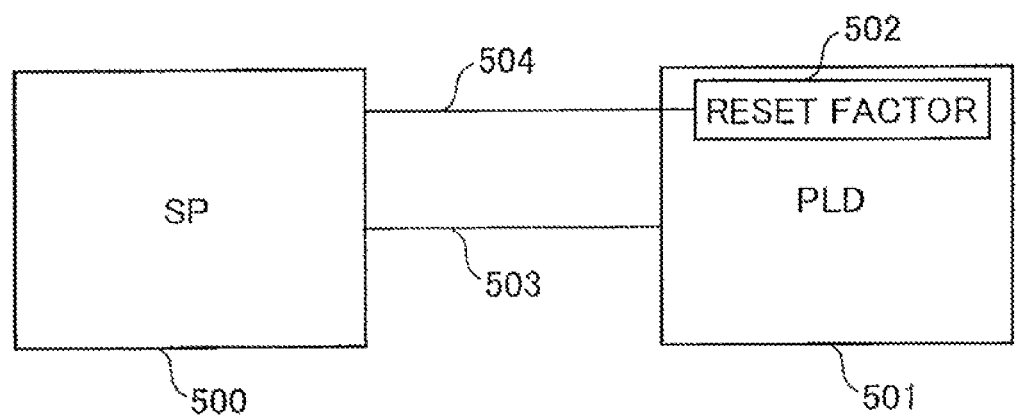
FIG. 5 A block diagram illustrating a connection relationship between a PLD and an SP of FIG. 3.

FIG. 5 is a view illustrating a connection relationship between the SP 303 and PLD 305 of FIG. 3. An SP 500 (corresponding to the SP 303 of FIG. 3) is a service processor (baseboard management controller) serving as a control center for operating the BMCFW. A PLD 501 (corresponding to PLD 305 of FIG. 3) is a programmable semiconductor device for monitoring a stall of the BMCFW operating on the SP 500. When the stall of the BMCFW is detected, a reset is issued from the PLD 501 to the SP 500 through a reset line 503.

The above mechanism is referred to as "Watchdog timer (WDT)". The BMCFW operating on the SP 500 can read a reset factor 502 in the PLD 501 through a PLD access path 504 and recognize whether the issued reset is a normal reset or a reset according to the WDT.

Figure 6:
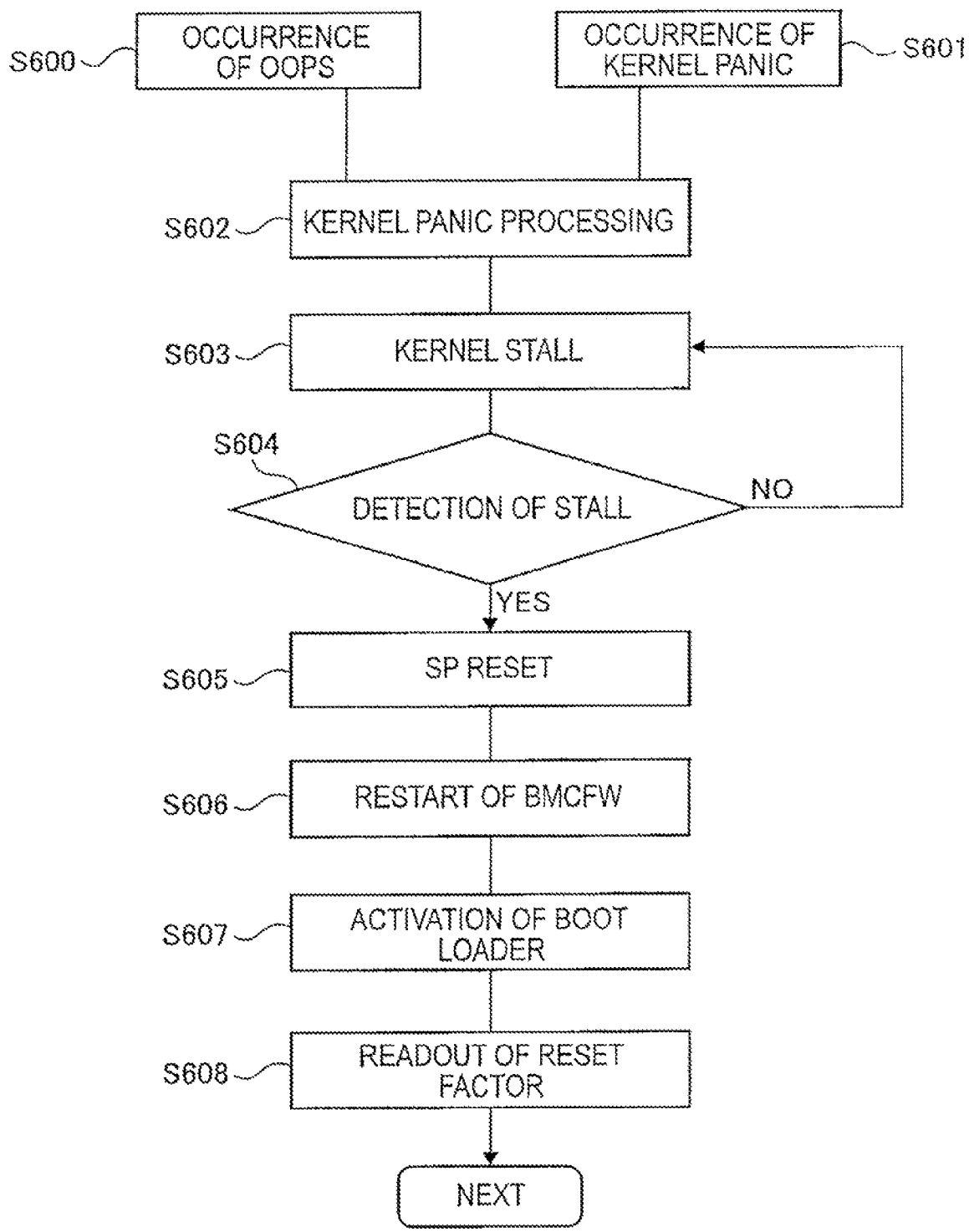
FIG. 6 A flowchart illustrating operation performed in the system illustrated in FIG. 3.
Figure 7:
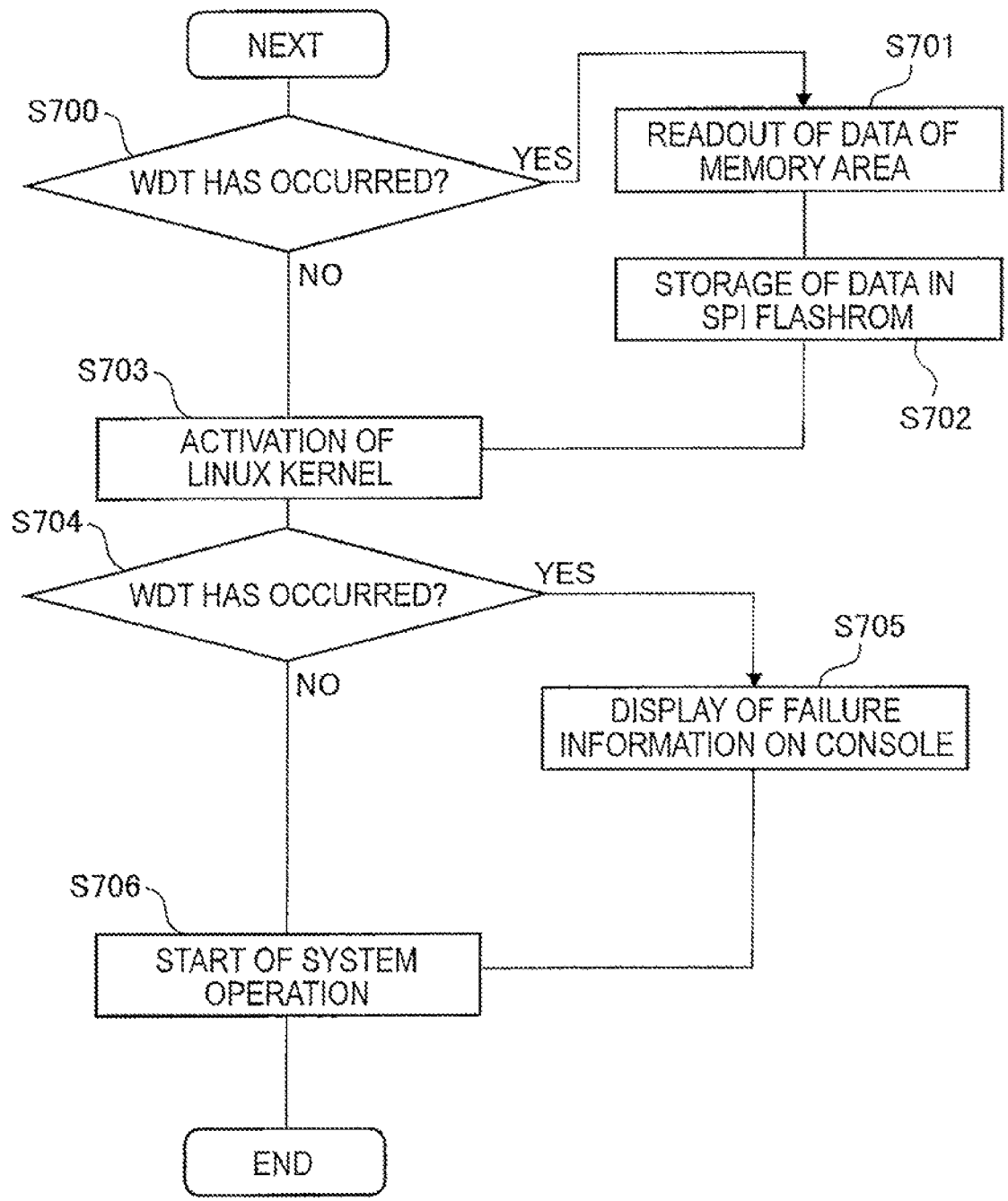
FIG. 7 A flowchart illustrating operation performed in the system illustrated in FIG. 3.

With reference to FIGS. 3 to 5, 6, and 7, operation of the present exemplary embodiment will be described in detail. FIGS. 6 and 7 are flowcharts illustrating operation of the present exemplary embodiment. In the server system illustrated in FIG. 3, upon power-on of the MGMT 301 on the CELL 300, a control processor of the SP 303 activates the BMCFW 302 stored in the FLASHROM. The BMCFW 302 takes the form of transferring program codes to the memory 304 and executing the program on the memory 304. The operating system of the BMCFW 302 is Embedded Linux, in which the software structure is divided into the boot loader 401 and Linux kernel 402 as illustrated in FIG. 4.

Upon activation of the BMCFW 302, the boot loader 401 is activated first, and the first 1 MB (0000_0000h to 00F_FFFFh) of the memory 304 is used as the operating memory area of the boot loader 401 according to the memory map 400 of FIG. 4. The boot loader 401 initializes a hardware (MGMT 301) which is required for launching the Linux kernel 402 and launches the Linux kernel 402. The Linux kernel 402 uses 127 MB (0010_0000h to 07FF_FFFFh) of the memory 304 as the operating memory area of the Linux kernel 402 according to the memory map 400 of FIG. 4.

With reference to flowcharts of FIGS. 6 and 7, the flow of processing performed upon occurrence of software failure in the BMCFW will be described up to crash dump collection. In the case where any contradiction (Oops) is found in the internal processing of the Linux kernel 402 during operation of the BMCFW 302 which is Embedded Linux, only the contradiction part is isolated while the operation of the Kernel is continued.

This mechanism is called Oops-associated processing (step S600 of FIG. 6). Considering that Embedded Linux is used as the firmware, it is necessary to make the system recover from occurrence of the Oops for restoration to normal operation state, so that the flow shifts to kernel panic processing after occurrence of the Oops (step S602 of FIG. 6).

In the case where a fatal failure is found in the internal processing of the Linux kernel 402 during operation of the BMCFW 302 which is Embedded Linux, it is determined that Kernel panic has occurred (step S601 of FIG. 6), and the flow shifts to kernel panic processing (step S602 of FIG. 6).

The Kernel panic processing (step S602 of FIG. 6) prohibits all hardware interrupts so as to bring the software operation of the BMCFW in a completely halted state (stall state) and goes into an infinite loop to thereby shift to a kernel stall state (step S603 of FIG. 6). In the kernel stall state, the BMCFW enters a completely halted state, the stall monitoring function of the PLD 305 is effected (step S604 of FIG. 6), and the SP 303 is reset by the PLD 305 after elapse of a certain time period (step S605 of FIG. 6).

After the SP 303 has been reset by the PLD 305, the stall state of the BMCFW is released, and the BMCFW is activated (step S606 of FIG. 6). After the activation of the BMCFW, the boot loader 401 is activated first (step S607 of FIG. 6) and reads the reset factor 502 that the PLD 501 of FIG. 5 retains therein through a PLD access path 504 (step S608 of FIG. 6).

Execution continues from step S608 of FIG. 6 to step S700 of FIG. 7. The boot loader 401 reads out the reset factor 502 to recognize whether the SP reset has been triggered by the PLD 305 (step S700 of FIG. 7). When determining that the SP reset has not been triggered by the PLD 305 (NO in step S700), which means that this activation is normal activation unrelated to a failure, so the boot loader 401 shifts to activation of the Linux kernel 402 (step S703 of FIG. 7).

On the other hand, when determining that the SP reset has been triggered by the PLD 305 (YES in step S700), which means that the BMCFW had been in a stall state, so the boot loader 401 collects (called "crash dump collection") data of the memory area used at the time when the Linux kernel 402 shifts to the kernel panic processing. More specifically, the boot loader 401 reads out data of the memory area of the memory 304 corresponding to 127 MB (0010_0000h to 07FF_FFFFh) used by the Linux kernel 402 (step S701 of FIG. 7) and stores the read out data in the SPI FLASHROM 306 of FIG. 3 (step S702 of FIG. 7).

In the SP reset triggered by the PLD 305, the power of the memory 304 is not turned off, so that the content of the memory 304 is retained. This mechanism allows the memory image at the time of occurrence of a failure to be collected before activation of the Linux kernel 402. After completion of the crash dump collection, the boot loader 401 shifts to activation of the Linux kernel 402 (step S703 of FIG. 7).

After being activated, the Linux kernel 402 starts its operation by using the memory area of the memory 304 corresponding to 127 MB (0010_0000h to 07FF_FFFFh). The Linux kernel 402 reads out the reset factor 502 to recognize whether the SP reset has been triggered by the PLD 305 (step S704 of FIG. 7). In the case where the SP reset has not been triggered by the PLD 305, which means that this activation is normal activation unrelated to a failure, so the Linux kernel 402 starts system operation (step S706 of FIG. 7). On the other hand, the SP reset has been triggered by the PLD 305, which means that the BMCFW had been in a stall state, the Linux kernel 402 displays information indicating occurrence of a failure on a console so as to notify a maintenance personnel or operator of the failure occurrence in an easily comprehensive manner (step S705 of FIG. 7). Thereafter, the Linux kernel 402 starts system operation (step S706 of FIG. 7).

The main points of the present exemplary embodiment are as follows.

(1) Source codes of the Linux kernel 402 are modified so as to handle the occurrence of the Oops as kernel panic.

(2) Source codes of the Linux kernel 402 are modified so as to bring the BMCFW into a completely halted state in order to allow the PLD 305 to reliably detect a stall at the time of occurrence of the kernel panic.

(3) Function of the PLD 305 allows discrimination between a reset associated with stall detection and a normal reset for determination of the reset factor.

(4) The content in the memory is retained in the reset associated with the stall detection by the PLD 305.

(5) The memory area is divided into two, one for the boot loader 401 and one for the Linux kernel 402 so as not to allow the boot loader 401 to break down the memory area of the Linux kernel 402 used at the time of occurrence of the stall in the crash dump collection processing by the boot loader 401.

(6) In the crash dump collection processing by the boot loader 401, the memory image at the time of occurrence of the stall is stored in the external FLASHROM 306 directly connected to the SP 303.

(7) The firmware is activated after completion of the crash dump collection so as to restart system operation.

As described above, in the present embodiment, the crash dump collection can be achieved in the BMCFW as Embedded Linux, thereby realizing analysis of failure occurrence. That is, collection of the crash dump (memory image at the time of occurrence of a failure) of Embedded Linux can be achieved, enabling analysis of software failure in the BMCFW and hardware failure in the MGMT. This minimizes system down time to allow system operation to continue.

The server system of the above exemplary embodiment is realized by hardware. However, The present invention may be realized by a computer reading and executing a program for allowing the computer to function as the server system from a computer-readable recording medium.

Further, the crash dump collection method of the above exemplary embodiment is realized by hardware. However, the crash dump collection method may be realized by a computer reading and executing a program for allowing the computer to execute the method from a computer-readable recording medium. Although the exemplary embodiments of the present invention have been described, it should be understood that the present invention can be practiced in various forms without departing from the spirit and scope of the invention as defined by the appended claims. Thus, the above exemplary embodiments are merely illustrative and should not be considered restrictive in any way. The scope of the present invention is defined by the appended claims and not restricted by the descriptions of the specification and abstract. Further, all variations and modifications which come within the equivalent range of the claims are embraced in the scope of the present invention.

The whole or part of the exemplary embodiments disclosed above can be described as, but not limited to, the following supplement notes.

(Supplementary note 1) A server system comprising:
    a device for monitoring a stall of firmware and performing
        a reset at the time of detection of the stall;

a memory having an area used by a boot loader of the firmware and an area used by another part of the firmware; and a controller for operating the boot loader to determine a reset factor that indicates whether the reset is a reset associated with the stall detection or a normal reset and to collect information in the area of the memory used by the another part of the firmware if the reset factor is the stall detection.

(Supplementary note 2) A server system comprising:
a management board (MGMT) that is mounted on a base board;
a controller for operating a firmware for controlling hardware components on the base board, the firmware having Embedded Linux as an operating system in which software structure is divided into a boot loader and a Linux kernel;
a first memory having a memory area used by the boot loader and a memory area used by the Linux kernel; and
a device that performs monitoring of a stall of the firmware and performs a reset if detecting the stall to restart the firmware,
wherein the controller operate the boot loader to read out a reset factor retained in the device at the time of restart of the firmware and to collect, if it is determined that a reset has been triggered by the device based on the reset factor, information in the memory area of the first memory used by the Linux kernel at the time of occurrence of the stall.

(Supplementary note 3) The server system according to Supplementary note 2, wherein the firmware is stored in a non-volatile memory.

(Supplementary note 4) The server system according to Supplementary note 2 or 3, wherein the information of the first memory is retained at the time of the reset triggered by the device.

(Supplementary note 5) The server system according to any one of Supplementary notes 2 to 4, wherein the information collected from the first memory area used by the Linux kernel is stored in a second memory different from the first memory.

(Supplementary note 6) A crash dump collection method of a server system including: a device for monitoring a stall of firmware and performing a reset at the time of detection of the stall; and a first memory having an area used by a boot loader of the firmware and an area used by another part of the firmware, wherein the firmware is operated by a controller,
said method comprising:
determining, by the controller, a reset factor that indicates whether the reset is a reset associated with the stall detection or a normal reset; and
collecting, by the controller, information in the area of the first memory used by the another part of the firmware if the reset factor is the stall detection.

(Supplementary note 7) The crash dump collection method according to Supplementary note 6, the server system further including a management board (MGMT) that is mounted on a base board, wherein the firmware controls hardware components on the base board and has Embedded Linux as an operating system in which software structure is divided into a boot loader and a Linux kernel, and the first memory has a memory area used by the boot loader and a memory area used by the Linux kernel,
said method comprising:
performing, by the device, monitoring of a stall of the firmware and performing a reset if detecting the stall to restart the firmware; and reading out, by the controller, a reset factor retained in the device at the time of restart of the firmware,
wherein the collecting by the controller, is collecting of information in the memory area of the first memory used by the Linux kernel at the time of occurrence of the stall.

(Supplementary note 8) The crash dump collection method according to Supplementary note 7, wherein the firmware is stored in a non-volatile memory.

(Supplementary note 9) The crash dump collection method according to Supplementary note 7 or 8, wherein the information of the first memory is retained at the time of the reset triggered by the device.

(Supplementary note 10) The crash dump collection method according to any one of Supplementary notes 7 to 9, wherein the information collected from the first memory area used by the Linux kernel is stored in a second memory different from the first memory.

{Reference Signs List}
300: CELL
301: MGMT
302: BMCFW
303: SP
304: Memory
305: PLD
306: SPI FLASHROM
400: Memory map
401: Boot loader
402: Linux kernel
500: PLD
501: SP
502: Reset factor
503: Reset line
504: PLD access path

The invention claimed is:

1. A server system comprising:
a device for monitoring a stall of firmware and performing a reset at the time of detection of the stall;
a first memory having an area used by a boot loader of the firmware and an area used by another part of the firmware;
a controller for operating the boot loader to determine a reset factor that indicates whether the reset is a reset associated with the stall detection or a normal reset and to collect information in the area of the first memory used by the another part of the firmware if the reset factor is the stall detection; and
a second memory for storing the information,
wherein the controller stores the information in the second memory by using the boot loader before the another part of the firmware is activated.

2. A server system comprising:
a management board (MGMT) that is mounted on a base board;
a controller for operating a firmware for controlling hardware components on the base board, the firmware having Embedded Linux as an operating system in which software structure is divided into a boot loader and a Linux kernel;
a first memory having a memory area used by the boot loader and a memory area used by the Linux kernel;
a device that performs monitoring of a stall of the firmware and performs a reset if detecting the stall to restart the firmware and
a second memory different from the first memory,
wherein the controller operates the boot loader to read out a reset factor retained in the device at the time of restart of the firmware and to collect, if it is determined that a reset has been triggered by the device based on the reset factor, information in the memory area of the first memory used by the Linux kernel at the time of occurrence of the stall, and wherein the controller stores the information in the second memory by using the boot loader before the Linux kernel is activated.

3. The server system according to claim 2, wherein the firmware is stored in a non-volatile memory.

4. The server system according to claim 2, wherein the information of the first memory is retained at the time of the reset triggered by the device.

5. A crash dump collection method of a server system including: a device for monitoring a stall of firmware and performing a reset at the time of detection of the stall; a first memory having an area used by a boot loader of the firmware and an area used by another part of the firmware; and a second memory different from the first memory, wherein the firmware is operated by a controller, said method comprising:

determining, by the controller, a reset factor that indicates whether the reset is a reset associated with the stall detection or a normal reset;

collecting, by operating the boot loader with the controller, information in the area of the first memory used by the another part of the firmware if the reset factor is the stall detection; and storing the information in the second memory by operating the boot loader with the controller before the another part of the firmware is activated.

6. The crash dump collection method according to claim 5, the server system further including a management board (MGMT) that is mounted on a base board, wherein the firmware controls hardware components on the base board and has Embedded Linux as an operating system in which software structure is divided into a boot loader and a Linux kernel, and the first memory has a memory area used by the boot loader and a memory area used by the Linux kernel, said method comprising:

performing, by the device, monitoring of a stall of the firmware and performing a reset if detecting the stall to restart the firmware; and reading out, by the controller, a reset factor retained in the device at the time of restart of the firmware, wherein the collecting by the controller is collecting of information in the memory area of the first memory used by the Linux kernel at the time of occurrence of the stall, and wherein the controller stores the information in the second memory by using the boot loader before the Linux kernel is activated.

7. The crash dump collection method according to claim 6, wherein the firmware is stored in a non-volatile memory.

8. The crash dump collection method according to claim 6, wherein the information of the first memory is retained at the time of the reset triggered by the device.

* * * * *